(12) United States Patent
Marti et al.

(10) Patent No.: US 10,362,104 B2
(45) Date of Patent: Jul. 23, 2019

(54) DATA MANAGER

(71) Applicant: Honeywell International Inc., Morris Plains, NJ (US)

(72) Inventors: Jerry Marti, West Salem, OH (US); Prabhat Ranjan, Bangalore (IN); Ajo Paul, Bangalore (IN); Bandi Narayanaswamy, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 374 days.

(21) Appl. No.: 14/862,858

(22) Filed: Sep. 23, 2015

(65) Prior Publication Data
US 2017/0085639 A1    Mar. 23, 2017

(51) Int. Cl.
| G06F 15/173 | (2006.01) |
| H04L 29/08 | (2006.01) |
| H04W 4/70 | (2018.01) |
| H04L 12/24 | (2006.01) |

(52) U.S. Cl.
CPC ........ *H04L 67/1065* (2013.01); *H04L 41/044* (2013.01); *H04W 4/70* (2018.02)

(58) Field of Classification Search
USPC .......................................... 709/223, 220, 227
See application file for complete search history.

(56) References Cited

U.S. PATENT DOCUMENTS

| 4,375,637 | A | 3/1983 | Desjardins |
| 4,816,208 | A | 3/1989 | Woods et al. |
| 5,042,265 | A | 8/1991 | Baldwin et al. |
| 5,161,387 | A | 11/1992 | Metcalfe et al. |
| 5,385,297 | A | 1/1995 | Rein et al. |
| 5,390,206 | A | 2/1995 | Rein et al. |
| 5,544,036 | A | 8/1996 | Brown, Jr. et al. |
| 5,768,119 | A | 6/1998 | Havekost et al. |
| 5,929,761 | A | 7/1999 | Van der Laan et al. |
| 5,949,303 | A | 8/1999 | Watson et al. |
| 5,955,306 | A | 9/1999 | Beheshti et al. |
| 6,031,343 | A | 2/2000 | Recknagel et al. |
| 6,124,790 | A | 9/2000 | Golov et al. |
| 6,141,595 | A | 10/2000 | Gloudeman et al. |
| 6,178,362 | B1 | 1/2001 | Woolard et al. |

(Continued)

FOREIGN PATENT DOCUMENTS

| WO | WO 01/97146 | 12/2001 |
| WO | WO 02/052432 | 7/2002 |

(Continued)

OTHER PUBLICATIONS http://www.loytec.com/products/web/lweb-900, "LWEB-900 Integrated Building Management System," 5 pages, printed Nov. 15, 2014.

(Continued)

*Primary Examiner* — Lan Dai T Truong
(74) *Attorney, Agent, or Firm* — Seager, Tufte & Wickhem LLP (57) ABSTRACT

A system and approach that provides a basis for monitoring, control, and communications among many remote controller sites and building equipment. A system architectural goal may be to distribute a workload of a supervisor across multiple processing units while maintaining a seamless and integrated workflow for a user experience.

7 Claims, 4 Drawing Sheets

(56) References Cited

U.S. PATENT DOCUMENTS

| | | |
|---|---|---|
| 6,185,483 B1 | 2/2001 | Drees |
| 6,195,309 B1 | 2/2001 | Ematrudo |
| 6,223,544 B1 | 5/2001 | Seem |
| 6,295,526 B1 | 9/2001 | Kreiner et al. |
| 6,295,527 B1 | 9/2001 | McCormack et al. |
| 6,301,624 B1 | 10/2001 | Lee et al. |
| 6,314,328 B1 | 11/2001 | Powell |
| 6,351,213 B1 | 2/2002 | Hirsch |
| 6,356,282 B2 | 3/2002 | Roytman et al. |
| 6,389,464 B1 | 5/2002 | Krishnamurthy et al. |
| 6,420,968 B1 | 7/2002 | Hirsch |
| 6,430,712 B2 | 8/2002 | Lewis |
| 6,466,654 B1 | 10/2002 | Cooper et al. |
| 6,473,407 B1 | 10/2002 | Ditmer et al. |
| 6,492,901 B1 | 12/2002 | Ridolfo |
| 6,535,122 B1 | 3/2003 | Bristol |
| 6,549,135 B2 | 4/2003 | Singh et al. |
| 6,643,355 B1 | 11/2003 | Tsumpes |
| 6,643,516 B1 | 11/2003 | Stewart |
| 6,675,591 B2 | 1/2004 | Singh et al. |
| 6,681,156 B1 | 1/2004 | Weiss |
| 6,690,980 B2 | 2/2004 | Powell |
| 6,761,470 B2 | 7/2004 | Sid |
| 6,813,587 B2 | 11/2004 | McIntyre et al. |
| 6,816,811 B2 | 11/2004 | Seem |
| 6,832,120 B1 | 12/2004 | Frank et al. |
| 6,836,794 B1 | 12/2004 | Lucovsky et al. |
| 6,859,827 B2 | 2/2005 | Banginwar |
| 6,870,141 B2 | 3/2005 | Damrath et al. |
| 6,879,253 B1 | 4/2005 | Thuillard |
| 6,892,546 B2 | 5/2005 | Singh et al. |
| 6,919,809 B2 | 7/2005 | Blunn et al. |
| 6,947,972 B2 | 9/2005 | Chun |
| 6,955,302 B2 | 10/2005 | Erdman, Jr. |
| 6,957,110 B2 | 10/2005 | Wewalaarachchi et al. |
| 6,966,060 B1 | 11/2005 | Young et al. |
| 6,970,763 B2 | 11/2005 | Kato |
| 6,973,627 B1 | 12/2005 | Appling |
| 6,990,821 B2 | 1/2006 | Singh et al. |
| 7,006,524 B2 | 2/2006 | Freeman et al. |
| 7,009,510 B1 | 3/2006 | Douglass et al. |
| 7,024,283 B2 | 4/2006 | Bicknell |
| 7,026,925 B2 | 4/2006 | Roche et al. |
| 7,031,880 B1 | 4/2006 | Seem et al. |
| 7,062,389 B2 | 6/2006 | Johnson et al. |
| 7,068,391 B2 | 6/2006 | Dewitte et al. |
| 7,068,931 B2 | 6/2006 | Tokunaga |
| 7,069,181 B2 | 6/2006 | Jerg et al. |
| 7,085,674 B2 | 8/2006 | Iwasawa |
| 7,107,268 B1 | 9/2006 | Zawadzki et al. |
| 7,113,085 B2 | 9/2006 | Havekost |
| 7,133,141 B1 | 11/2006 | Abi-Salch |
| 7,155,462 B1 | 12/2006 | Singh et al. |
| 7,171,287 B2 | 1/2007 | Weiss |
| 7,183,907 B2 | 2/2007 | Simon et al. |
| 7,206,646 B2 | 4/2007 | Nilson et al. |
| 7,243,044 B2 | 7/2007 | McCalla |
| 7,250,856 B2 | 7/2007 | Havekost et al. |
| 7,260,619 B2 | 8/2007 | Yoneda |
| 7,272,452 B2 | 9/2007 | Coogan et al. |
| 7,277,018 B2 | 10/2007 | Reyes et al. |
| 7,302,478 B2 | 11/2007 | Conrad |
| 7,308,539 B2 | 12/2007 | Fuhs et al. |
| 7,320,023 B2 | 1/2008 | Chintalapati et al. |
| 7,345,580 B2 | 3/2008 | Akamatsu et al. |
| 7,379,997 B2 | 5/2008 | Ehlers et al. |
| 7,386,586 B1 | 6/2008 | Headley et al. |
| 7,428,726 B1 | 9/2008 | Cowan et al. |
| 7,457,869 B2 | 11/2008 | Kernan |
| 7,460,020 B2 | 12/2008 | Reyes et al. |
| 7,490,319 B2 | 2/2009 | Blackwell et al. |
| 7,496,911 B2 | 2/2009 | Rowley et al. |
| 7,565,225 B2 | 7/2009 | Dushane et al. |
| 7,596,613 B2 | 9/2009 | Silverthorne et al. |
| 7,502,329 B2 | 10/2009 | Li et al. |
| 7,644,371 B2 | 1/2010 | Robertson et al. |
| 7,653,459 B2 | 1/2010 | Pouchak et al. |
| 7,703,073 B2 | 4/2010 | Illowsky et al. |
| 7,734,572 B2 | 6/2010 | Wiemeyer et al. |
| 7,760,081 B2 | 7/2010 | Eiden et al. |
| 7,774,457 B1 | 8/2010 | Talwar et al. |
| 7,782,302 B2 | 8/2010 | Lee et al. |
| 7,819,334 B2 | 10/2010 | Pouchak et al. |
| 7,826,929 B2 | 11/2010 | Wacker |
| 7,870,090 B2 | 1/2011 | McCoy et al. |
| 7,873,719 B2 | 1/2011 | Bishop et al. |
| 7,886,031 B1 | 2/2011 | Taylor et al. |
| 7,890,927 B2 | 2/2011 | Eldridge et al. |
| 7,900,228 B2 | 3/2011 | Stark et al. |
| 7,904,186 B2 | 3/2011 | Mairs et al. |
| 7,904,608 B2 | 3/2011 | Price |
| 7,928,239 B2 | 4/2011 | Dumas et al. |
| 7,933,981 B1 | 4/2011 | Cannon, III et al. |
| 7,941,786 B2 | 5/2011 | Scott et al. |
| 7,953,847 B2 | 5/2011 | Grelewicz et al. |
| 8,059,301 B2 | 11/2011 | Eigenbrodt et al. |
| 8,060,602 B2 | 11/2011 | Singh et al. |
| 8,078,481 B2 | 12/2011 | Steinbarth et al. |
| 8,090,477 B1 | 1/2012 | Steinberg |
| 8,112,162 B2 | 2/2012 | Pouchak et al. |
| 8,144,028 B2 | 3/2012 | LaMothe et al. |
| 8,146,060 B2 | 3/2012 | Lekel |
| 8,185,871 B2 | 5/2012 | Nixon et al. |
| 8,190,273 B1 | 5/2012 | Federspiel et al. |
| 8,218,570 B2 | 7/2012 | Moran et al. |
| 8,224,466 B2 | 7/2012 | Wacker |
| 8,224,763 B2 | 7/2012 | Guralnik et al. |
| 8,224,888 B2 | 7/2012 | Brindle |
| 8,225,292 B2 | 7/2012 | Naslavsky et al. |
| 8,239,500 B2 | 8/2012 | Pouchak |
| 8,255,896 B2 | 8/2012 | Wontorcik et al. |
| 8,301,386 B1 | 10/2012 | Redmond et al. |
| 8,335,593 B2 | 12/2012 | Johnson et al. |
| 8,341,049 B2 | 12/2012 | Gomes et al. |
| 8,341,599 B1 | 12/2012 | Angalet et al. |
| 8,347,291 B2 | 1/2013 | Marwinski |
| 8,352,047 B2 | 1/2013 | Walter |
| 8,387,048 B1 * | 2/2013 | Grechishkin ....... G06F 9/45533 718/1 |
| 8,417,666 B2 | 4/2013 | Bailor et al. |
| 8,499,060 B2 | 7/2013 | Narayanan et al. |
| 8,527,947 B2 | 9/2013 | Clemm |
| 8,572,502 B2 | 10/2013 | Dharwada et al. |
| 8,572,616 B2 | 10/2013 | Cai et al. |
| 8,577,940 B2 | 11/2013 | Tormasov et al. |
| 8,594,850 B1 | 11/2013 | Gourlay et al. |
| 8,600,556 B2 | 12/2013 | Nesler et al. |
| 8,640,098 B2 | 1/2014 | Nair et al. |
| 8,819,562 B2 | 8/2014 | Nair et al. |
| 8,892,954 B1 | 11/2014 | Gray et al. |
| 8,930,030 B2 | 1/2015 | Bester et al. |
| 8,938,557 B2 | 1/2015 | Meyer et al. |
| 8,954,016 B2 | 2/2015 | Seiler et al. |
| 8,965,850 B2 | 2/2015 | Varadarajan |
| 8,984,169 B2 | 3/2015 | Mera et al. |
| 9,026,253 B2 | 5/2015 | Majewski et al. |
| 9,043,463 B1 | 5/2015 | Cohn et al. |
| 9,122,535 B2 | 9/2015 | Soundararajan et al. |
| 9,158,531 B2 | 10/2015 | Lin |
| 9,239,718 B2 | 1/2016 | Grinberg et al. |
| 9,280,337 B2 | 3/2016 | Palaniappan |
| 9,389,850 B2 | 7/2016 | Walter et al. |
| 9,395,711 B2 | 7/2016 | Clark et al. |
| 9,423,789 B2 | 8/2016 | Cornell et al. |
| 9,578,465 B2 | 2/2017 | Da Silva Neto et al. |
| 2002/0002425 A1 | 1/2002 | Dossey et al. |
| 2002/0073076 A1 | 6/2002 | Xu et al. |
| 2002/0122073 A1 | 9/2002 | Abrams et al. |
| 2002/0152298 A1 | 10/2002 | Kikta et al. |
| 2003/0078677 A1 | 4/2003 | Hull et al. |
| 2003/0101009 A1 | 5/2003 | Seem |
| 2003/0171851 A1 | 9/2003 | Brickfield et al. |
| 2003/0217357 A1 | 11/2003 | Parry |
| 2004/0027004 A1 | 2/2004 | Bayoumi et al. |

(56) References Cited

U.S. PATENT DOCUMENTS

| | | |
|---|---|---|
| 2004/0138981 A1 | 7/2004 | Ehlers et al. |
| 2004/0143510 A1 | 7/2004 | Haeberle et al. |
| 2004/0230328 A1 | 11/2004 | Armstrong et al. |
| 2005/0015621 A1* | 1/2005 | Ashley ............... H04L 63/0227 726/4 |
| 2005/0038571 A1 | 2/2005 | Brickfield et al. |
| 2005/0043862 A1 | 2/2005 | Brickfield et al. |
| 2005/0071457 A1 | 3/2005 | Yang-Huffman et al. |
| 2005/0143863 A1 | 6/2005 | Ruane et al. |
| 2005/0193285 A1 | 9/2005 | Jeon |
| 2005/0201393 A1 | 9/2005 | Hatayama et al. |
| 2005/0203490 A1 | 9/2005 | Simonson |
| 2005/0222889 A1 | 10/2005 | Lai et al. |
| 2006/0020962 A1 | 1/2006 | Stark et al. |
| 2006/0038672 A1 | 2/2006 | Schoettle |
| 2006/0058923 A1 | 3/2006 | Kruk et al. |
| 2006/0064305 A1 | 3/2006 | Alonso |
| 2006/0069886 A1 | 3/2006 | Sandoval |
| 2006/0077726 A1 | 4/2006 | Simmitsu |
| 2006/0136558 A1 | 6/2006 | Sheehan et al. |
| 2006/0168013 A1 | 7/2006 | Wilson et al. |
| 2006/0253205 A1 | 11/2006 | Gardiner |
| 2006/0265708 A1 | 11/2006 | Blanding et al. |
| 2007/0078913 A1 | 4/2007 | Crescenti et al. |
| 2007/0123249 A1 | 5/2007 | Sun |
| 2007/0198674 A1 | 8/2007 | Li et al. |
| 2008/0005787 A1 | 1/2008 | Aldred |
| 2008/0010049 A1 | 1/2008 | Pouchak et al. |
| 2008/0189162 A1 | 8/2008 | Ganong et al. |
| 2008/0301668 A1 | 12/2008 | Zachmann |
| 2009/0055914 A1 | 2/2009 | Azami |
| 2009/0106684 A1 | 4/2009 | Chakra et al. |
| 2009/0113037 A1 | 4/2009 | Pouchak |
| 2009/0205040 A1 | 8/2009 | Lunke |
| 2009/0287526 A1 | 11/2009 | Ramkumar et al. |
| 2009/0295571 A1 | 12/2009 | Hosey |
| 2009/0319532 A1 | 12/2009 | Akelbein et al. |
| 2010/0031324 A1 | 2/2010 | Strich et al. |
| 2010/0106543 A1 | 4/2010 | Marti |
| 2010/0131653 A1 | 5/2010 | Dharwada et al. |
| 2010/0131877 A1 | 5/2010 | Dharwada et al. |
| 2010/0198651 A1 | 8/2010 | Johnson et al. |
| 2010/0251184 A1 | 9/2010 | Majewski et al. |
| 2010/0286937 A1 | 11/2010 | Hedley et al. |
| 2010/0332293 A1* | 12/2010 | Merchant ............... G06Q 10/00 705/7.37 |
| 2011/0010654 A1 | 1/2011 | Raymond et al. |
| 2011/0087731 A1 | 4/2011 | Wong et al. |
| 2011/0093493 A1 | 4/2011 | Nair et al. |
| 2011/0098863 A1 | 4/2011 | Miki |
| 2011/0113360 A1 | 5/2011 | Johnson et al. |
| 2011/0196539 A1 | 8/2011 | Nair et al. |
| 2011/0298608 A1 | 12/2011 | Ranjan et al. |
| 2011/0316688 A1 | 12/2011 | Ranian et al. |
| 2012/0005731 A1 | 1/2012 | Lei et al. |
| 2012/0011496 A1 | 1/2012 | Shimamura |
| 2012/0096521 A1* | 4/2012 | Peddada ............... G06F 21/629 726/4 |
| 2012/0166992 A1 | 6/2012 | Huynh et al. |
| 2013/0218889 A1 | 8/2013 | Marti et al. |
| 2014/0114440 A1 | 4/2014 | Marti et al. |
| 2014/0180738 A1* | 6/2014 | Phillipps ............... G06N 99/005 705/7.12 |
| 2014/0280878 A1 | 9/2014 | Hardin et al. |
| 2014/0289202 A1 | 9/2014 | Chan et al. |
| 2014/0344798 A1 | 11/2014 | Sasaki |
| 2015/0007157 A1 | 1/2015 | Park et al. |
| 2015/0105878 A1 | 4/2015 | Jones et al. |
| 2015/0112989 A1 | 4/2015 | Marti et al. |
| 2015/0201020 A1 | 7/2015 | Gueta |
| 2015/0295998 A1 | 10/2015 | Morrill et al. |
| 2015/0326450 A1* | 11/2015 | Cruz Mota ......... H04L 41/5054 709/223 |
| 2016/0011573 A1 | 1/2016 | Marti et al. |
| 2017/0102680 A1 | 4/2017 | Marti et al. |
| 2017/0272316 A1* | 9/2017 | Johnson ............... G06Q 10/103 |

FOREIGN PATENT DOCUMENTS

| | | |
|---|---|---|
| WO | WO 03/090038 | 10/2003 |
| WO | WO 2004/053772 | 6/2004 |
| WO | WO 2004/055608 | 7/2004 |
| WO | WO 2004/070999 | 8/2004 |
| WO | WO 2005/020167 | 3/2005 |
| WO | WO 2006/048397 | 5/2006 |
| WO | WO 2007/024622 | 3/2007 |
| WO | WO 2007/024623 | 3/2007 |
| WO | WO 2007/027685 | 3/2007 |
| WO | WO 2007/082204 | 7/2007 |

OTHER PUBLICATIONS

Samsung, "Intelligent Building Management System, ControlCity-NX," 20 pages, May 31, 2012.

U.S. Appl. No. 14/862,715, filed Sep. 23, 2015.

Adobe Acrobat 6.0 Standard, Version 6.0.2, Screenshots, 2 pages, May 18, 2004.

Atere-Roberts et al., "Implementation of a Computerized Maintenance Management System for the City of Atlanta," 13 pages, Proceedings of the Water Environment Federation, Jan. 1, 2002.

Bersoff et al., "Impacts of Life Cycle Models on Software," Communications of the ACM, vol. 34, No. 8, pp. 104-118, Aug. 1991.

Business Objects, Crystal Reports Acess, Format, and Integrate Data, 4 pages, Dec. 2003.

Honeywell Spyder Bacnet User's Guide, 242 pages, Revised Jul. 2009.

Honeywell Spyder User's Guide 202 pages, Released Jul. 2007.

Honeywell, "ComfortPoint Open BMS Release 100," Specification and Technical Data, 13 pages, Jun. 2012.

Honeywell, "Excel Building Supervisor-Integrated R7044 and FS90 Ver. 2.0," Operator Manual, 70 pages, Apr. 1995.

Honeywell, "Excel 15B W7760B Building Manager," User's Guide, 84 pages, Revised Jan. 2005.

http://blogs.msdn.com/b/khen1234/archive/2005/05/11/416392.aspx, "Regular Expressions in T-SQL," 4 pages, May 11, 2005.

http://domin.dom.edu/documents/emaildocs/outlook/, "Outlook Web Access 2003," 19 pages, printed Nov. 7, 2013.

http://en.wikipedia.org/wiki/JAR_(file_format), "JAR (file Format)—Wikipedia, the Free Encyclopedia," 3 pages, printed Dec. 26, 2009.

http://www.de2m.com/DE2R_Technical.html, "Data Enabled Enterprise Repository (DE2R) Technical Overview," 4 pages, printed Mar. 8, 2013.

http://www.google.com/maps, "Google Maps, Pin Location," 1 page, prior to Nov. 21, 2008.

Johnson Controls, "Fx Workbench, User's Guide," 818 pages, issued May 19, 2008, (this article will be uploaded to USPTO website in 5 parts).

Kalavade et al., "A Hardware-Software Codesign Methodology for DSP Applications," IEEE Design and Test of Computers, pp. 16-28, 1993.

Magnusson et al., "Simics: A Full Simulation Platform," IEEE, pp. 50-58, 2002.

McCown et al., "APSIM: A Novel Software System for Model Development, Model Testing and Simulation in Agricultural Systems Research," Agricultural Systems, vol. 50, pp. 255-271, 1996.

Microsoft Word Screen Shots, 2 pages, prior to Nov. 21, 2008.

Niagara, "Niagara AX-3.x User Guide," Tridium Inc., 436 pages, 2007.

Novar, "Opus Supervisor User Guide," pp. 1-159, Feb. 1, 2012.

Novar, "Demand Response, Program Implementation and Execution," 8 pages, Oct. 28, 2008.

Novar, "Media Backgrounder," 10 pages, prior to Feb. 22, 2012.

Pressman, "Software Engineering Notes—Compiled Compiled from Software Engineering A Practitioner's Approach," Fifth Edition, 67 pages, 2009.

(56) References Cited

OTHER PUBLICATIONS

Siemens, BACnet for DESIGO 27 Pages, prior to Dec. 30, 2009.
Simunic et al, "Cycle-Accurate Simulation of Energy Consumption in Embedded Systems," ACM, pp. 867-872, 1999.
Trane, "System Programming, Tracer Summit Version 14, BMTW-SVP01D-EN," 623 pages, 2002, (this article will be uploaded to USPTO website in 3 parts).
Trane, "Tracer MP580/581 PRogrammable Controllers," CNT-PRC002-EN, Mar. 2003.
Tridium, "NiagaraAX Product Model Overview," 7 pages, 2005.
Tridium, "Tridium & Niagara Framework Overview," 9 pages, prior to Oct. 28, 2008.
Vykon by Tridium, "Niagara Browser Access Guide," 125 pages, revised Aug. 15, 2002.
Vykon by Tridium, "Niagara Networking & Connectivity Guide," Niagara Release 2.3, 245 pages, 2002.

\* cited by examiner

DATA MANAGER

BACKGROUND

The present disclosure pertains to communications and particularly to data management of numerous entities spread out over a large area.

SUMMARY

The disclosure reveals a system and approach that provides a basis for monitoring, control, and communications among many remote controller sites and building equipment. A system architectural goal may be to distribute a workload of a supervisor across multiple processing units while maintaining a seamless and integrated workflow for a user experience.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

The Novar™ Opus™ supervisor may provide the system and approach that is being disclosed herein. A user of the Novar Opus supervisor may manage and communicate with hundreds or thousands of remote site controllers from a centralized location via the users' intranet. These site controllers may be referred to as an XCM controller or XCM. The XCM in turn may manage and communicate with tens or hundreds of field controllers within the site that performs real time control of building equipment such as HVAC units, lighting panels, metering and refrigeration circuits.

The Opus supervisor may be a single instance application designed to support all the supervisory functions needed by an Opus building automation system (BAS). The terms "application" and "app" may be used interchangeably herein. A supervisor application may typically be serving upwards of thirty plus simultaneous user client connections requesting data and invoking of numerous multi-site operations. The functions available to the users may incorporate site monitoring, configuration and version management, batch setpoint and schedule updates and data report generation. Also, the same supervisor may be responsible to collect runtime alarms, historical trend data, site backups and configuration data from all sites into centralized databases.

An issue that Novar may have experienced is that the single process Opus Supervisor application does not appear to perform adequately or reliably when burdened with all the work associated with supporting thousands of deployed sites of XCM controllers. For example, each site XCM may be typically configured with 600 plus historical trend logs. A customer with 2000 sites may expect to be collecting two to three Gigabytes of historical data each day, depending on recording intervals. The supervisor application may also be collecting thousands of alarms from the 2000 sites throughout a day. Additionally, users may be connected to the supervisor performing individual site downloads, site backups or batch updates across all sites. The users also may be running multi-site reports of historical data or configuration exception reports. All of these operations running simultaneously appear to have shown experientially to be too much for a single supervisor application. An experience with a Novar customer of 2000 sites may have unveiled the architectural deficiency of an existing single process Opus supervisor application. In supporting the customer, one may need to monitor the operation of the Opus supervisor very closely to maintain its operation. The supervisor application may be found to be using significant system memory and CPU consumption resulting in an extremely unstable application. In the future, there may be additional customers that will require the supervisor to support up to nearly 25,000 site XCM's. The only approach to solving this with the current offering appears to be installing and configuring multiple Opus supervisors each with a smaller fixed number of supported sites. However, this solution may be unacceptable to the customer as each instance is independent and could require the user to perform significantly more workflow actions to navigate to more than one supervisor to perform the required operations.

The present system and approach may provide a solution to the issue by providing the following product features and the necessary user activities required to use these features. A new product may be provided labeled as an Opus data manager. The product may be a focus of the present system. Architectural goals of the Opus data manager may be simply to distribute the workload of the existing Opus supervisor across multiple processing units while at the same time maintaining a seamless and integrated workflow for the user experience. As customer enterprises grow with the addition of more sites, additional Opus data managers may be added to support the growth. An existing feature set of the single instance Opus supervisor may continue to operate as it is not necessarily requiring the user to knowingly make use of the distributed processing units. The Opus data manager framework may provide distributed processing for select Opus supervisor application features. For example, the Opus supervisor feature that imports historical trend data from virtually all the remote sites into relation databases may heavily burden the single Opus supervisor application. For a customer having 2000 sites, two instances of an Opus data manager history application may each support 1000 sites. Initially, the Opus data manager may provide distributed application support for history data collection, alarm collection and meter data management. Additional feature based applications may be also available for distribution. Once the distributed applications are running, the Opus supervisor may automatically distribute the configuration (work) to be performed to the available application. The Opus data manager and associated applications may maintain a runtime capacity percentage that can be used by the Opus supervisor when distributing the work load. This may allow the Opus supervisor to continue to scale by identifying the optimal processing unit to handle the distributed work. A feature for the distributed application may be that the work can be performed independently and autonomously where resulting data updates are integrated back to the main Opus supervisor. This approach may be accomplished by using Niagara™ communications and services, files or databases.

To summarize, the Opus data manager product may enable the Novar Opus BMS system to more easily scale to support the anticipated growth of the customer enterprises. The following items considered as features may incorporate a distributed processing framework providing a path for future scale improvements, maintained single user workflow experience with multi-application integration, and automatic capacity balancing.

A significant difference of the present approach is that the Opus data manager framework may solve the issue of scalability by allowing the addition of new instances of applications and new application types as scaling improvements are incrementally introduced.

An Opus data manager may be an installation of a Niagara environment that will provide an Opus data manager station and a library of predefined set of Opus application templates (stations) available to run within that environment. An Opus data manager may be a framework that can run one or more applications, depending on the available host server resources. A built-in Opus data manager station may be primarily responsible for an integration with the Opus supervisor. The initial application templates available may be for alarm collection, history collection and meter data collection. New application templates may be available to distribute work for site backups, and report data collection and batch execution. After an Opus data manager is installed on an independent host server, it may be joined to the main Opus supervisor. This integration may allow for a seamless workflow for the existing Opus supervisor activities. The BMS engineer may instantiate the required application instances needed to offload the Opus supervisor. Once the applications are created, the user may configure any application setup required as an initial, one time activity. After this is complete, the distributed application may be running and integrated with the Opus supervisor. The BMS programmer may perform an existing activity to join a new site XCM to the Opus supervisor. A new "XCM join" process may detect an existence of the Opus data manager and associated applications. The XCM join process may automatically add the XCM specific configuration required to the distributed application. Another aspect of the XCM join may be to support multiple instances of a particular application template type. For example, if the XCM join is distributing work to a history application, the "join" may query the Opus data managers for the capacity of each of the existing history applications. Based on the resulting available capacities, the join process may find a distributed application best suited with the most available capacity to be assigned the work. Also, if during the XCM join process a distributed application is not necessarily found, the XCM may be configured (joined) into the main Opus supervisor.

An Opus multi-supervisor may simply maintain existing supervisory functionality but allow for application features and work to be distributed across multiple processing units as sites are being added to the system. The views may convey how each function can be distributed. An element to accomplish the Opus multi-supervisor may be the Opus data manager.

An Opus data manager may be an installation of a Niagara environment that can provide a predefined set of Opus application templates (stations) available to run within that environment. An Opus data manager may be a framework that can run one or more applications, depending on the available host server resources. The initial application templates available may be for alarm collection, history collection and meter data collection. New application templates may be made available to distribute work for site backups, and report data collection and batch execution.

An Opus meter manager app may collect meter data from multiple sites and send the data to a utility. An Opus history app may collect historical time series and event data provided to an Opus structured query language (SQL) database. An Opus alarm app may collect alarm and event data provided to an Opus SQL database.

Figure 1:
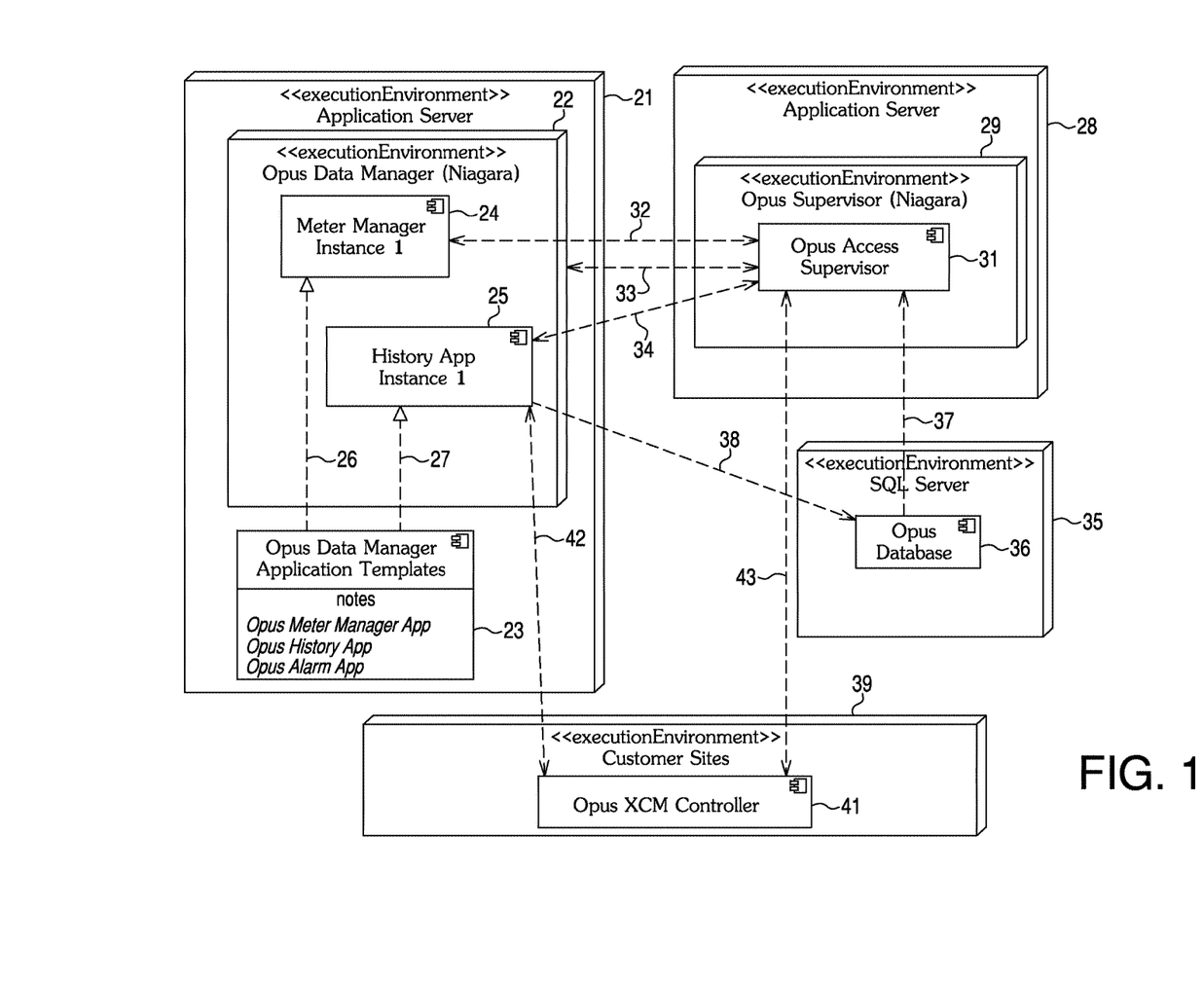
FIG. 1 is a diagram of a data management system.

An Opus data manager may be indicated in a diagram of FIG. 1. Each application instance may support a limited number of deployed site XCM controllers or meters. As the number sites increases beyond the limit that an application can support, the user may be advised to add additional applications or Opus data managers to support the continued growth.

An Opus multi-supervisor structure may consist of existing elements of a current single Opus supervisor architecture. This may include the Opus architect client (workbench), the Opus supervisor station, one or more Opus data managers and one or more application stations.

Figure 2:
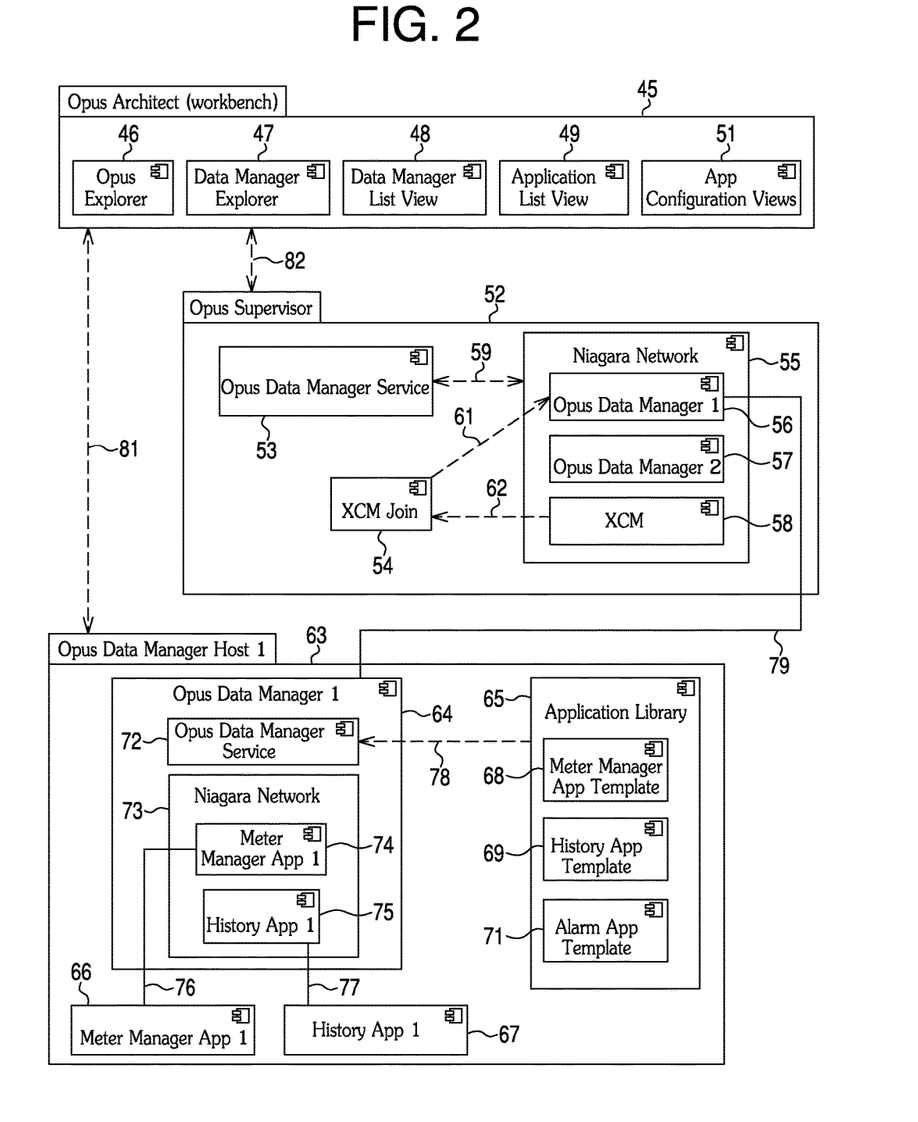
FIG. 2 is a diagram of a multi supervisor structure layout.

An Opus multi supervisor structure may be revealed in a diagram of FIG. 2. The Opus data manager may exist as an additional element of the existing Opus supervisor structure.

An overall Opus multi supervisor environment may consist of multiple Opus architect clients, a single Opus supervisor and one or more Opus data managers. Within an Opus data manager, there may be one or more Opus applications used to distribute work from the Opus supervisor.

The Opus architect (workbench) may be available within the Opus data manager installation environment for local host configuration of the Opus data manager. When connected, the Opus data manager platform may be accessed as well as the Opus data manager station and all running application stations. Alternately, when the Opus architect is connected to the Opus supervisor, the user may navigate to any instance of the Opus data manager.

The Opus supervisor may provide a new Opus data manager service. The service may support the seamless integration of Opus data managers and associated applications. An example of the integration may be to ensure that when the user invokes an existing XCM join feature, the supervisor can ensure that the new site XCM is also configured in a distributed application. The example may be accomplished by the Opus data manager service and with access to the Opus data manager stations within the Opus supervisor Niagara network.

Finally, the Opus data manager element may be a full NiagaraAX™ environment inclusive of the Opus data manager station and a library of available Opus application templates. Upon installation, the Opus data manager station may be joined to the Opus supervisor. This act may allow for a seamless integration of any and virtually all applications added to the Opus data manager. Once available, a BMS engineer may instantiate one or more Opus applications from the application library. The running applications may now be accessible to the Opus supervisor for distributing work.

Figure 3:
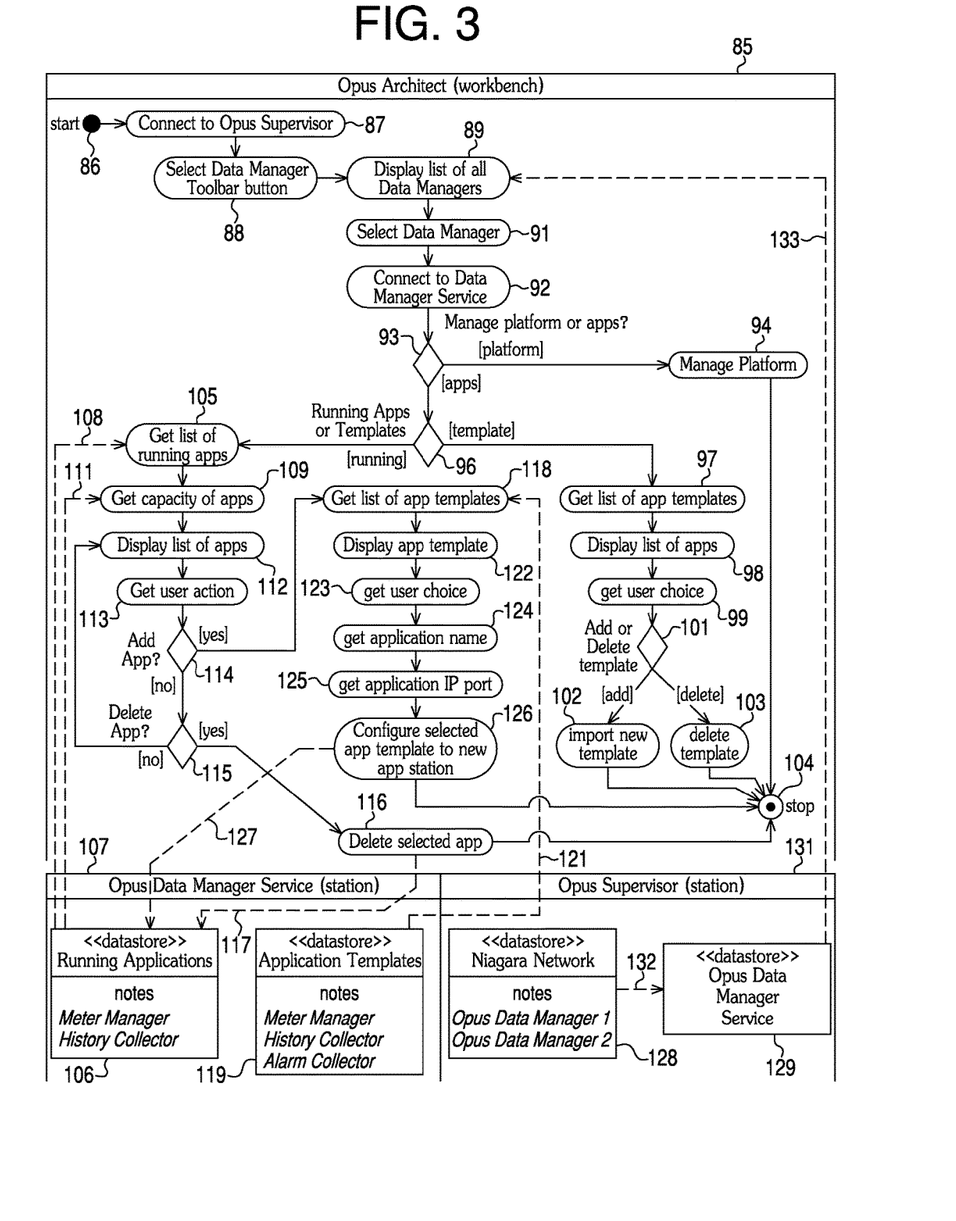
FIG. 3 is a diagram of a data manager with an integrated workflow.

An Opus data manager with integrated supervisor access may be revealed in a diagram of FIG. 3. A key architectural goal may be for the Opus data manager and associated applications to be seamlessly integrated with the Opus supervisor. The Opus data manager may be accessed via the Opus supervisor and Opus architect client remotely not necessarily needing the user to be logged into on a local server host of the Opus data manager. The activity flow may depict how a BMS engineer user can navigate to and manage the distributed Opus data managers. The activities may usually be performed one time for setup and not necessarily be needed by the daily users.

Figure 4:
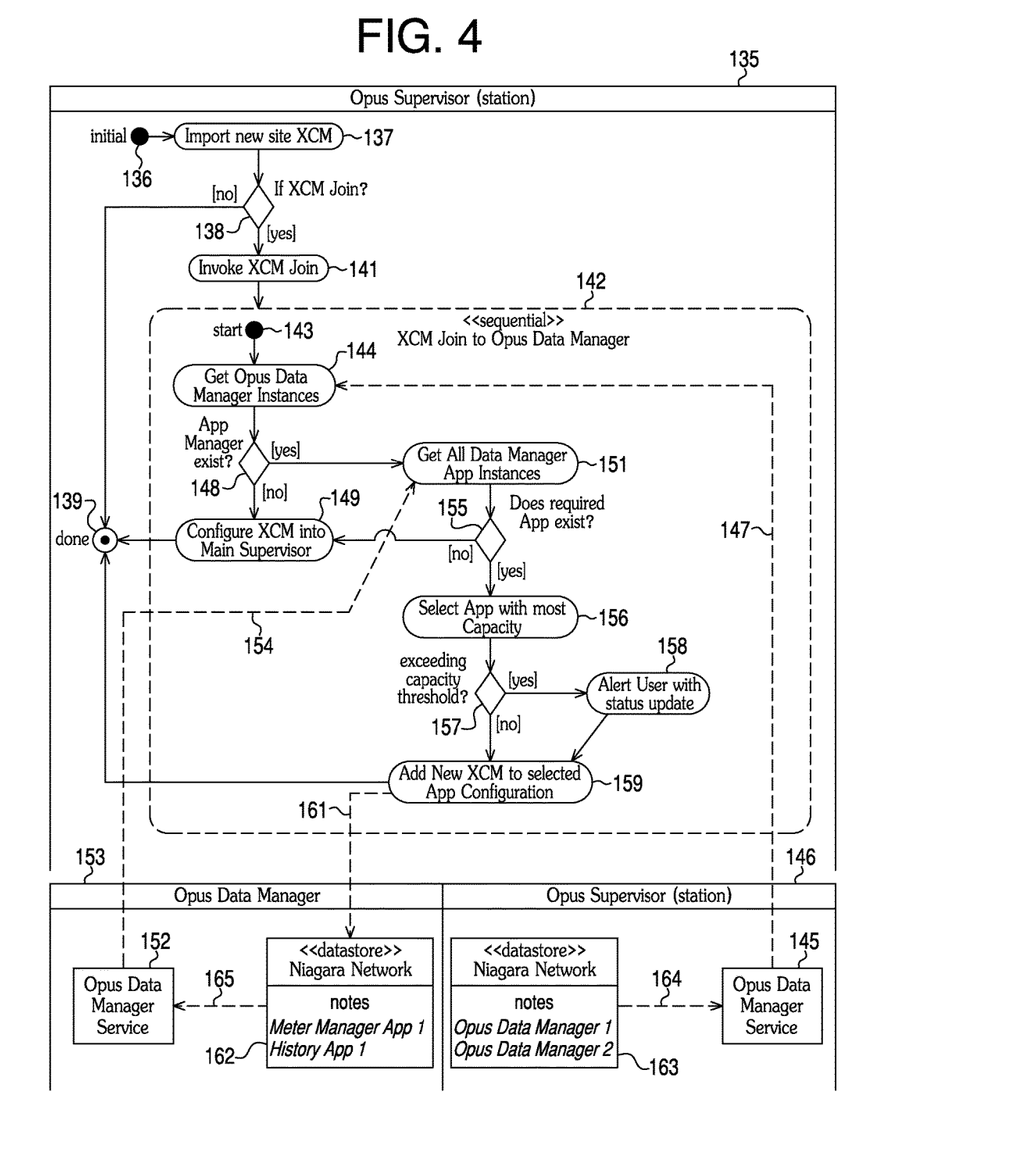
FIG. 4 is a diagram of a data manager for a site controller join module.

An Opus "XCM join" to an Opus data manager app may be noted in a diagram of FIG. 4. A workflow to establish a newly deployed Opus XCM into the Opus supervisor may make use of the Niagara join feature. The feature may automate numerous manual configurations to ensure ease of use and consistency when joining the XCM. To support the existence of Opus data managers, the XCM join may follow the activity flow as seen in FIG. 4.

FIG. 1 is a diagram of deployment of an Opus™ data manager system layout. An application server 21 may incorporate a data manager (Niagara™) 22 and data manager application templates module 23. Data manager 22 may incorporate a meter manager instance 24 and a history application instance 25. A connection 26 may go from data manager application templates module 23 to create a meter manager instance 24. A connection 27 may go from data manager application templates module 23 to create a history application instance 25.

An application server 28 may incorporate a supervisor 29 which in turn may have an access supervisor 31. A connection 32 for access may be between meter manager instance module 24 and access supervisor 31. A connection 33 for access may be between access supervisor 31 and data manager 22. A connection 34 for access may be between history application instance module 25 and access supervisor 31.

An SQL server 35 may have a database 36. There may be a connection 37 used for data reads and writes from database 36 to access supervisor 31. A connection 38 used for data writes may go from history application instance module 25 to database 36.

A customer sites module 39 may incorporate an XCM controller 41. A connection 42 for communications may be between history application instance module 25 and XCM controller 41. Between access supervisor 31 and XCM controller 41 may be a communications connection 43.

FIG. 2 is a diagram of an Opus multi supervisor structure layout depicting the deployment and access architecture. An architect (workbench) module 45 may incorporate an Opus explorer 46, a data manager explorer 47, a data manager list view module 48, an application list view module 49, and an application configuration views module 51.

An Opus supervisor 52 may incorporate a data manager service module 53, an XCM join module 54 and a network 55. Network 55 may incorporate a data manager reference 56, a data manager reference 57, and an XCM reference 58. An access connection 59 may be between data manager service module 53 and data manager reference 56. An access connection 61 may go from XCM join module 54 to data manager reference 56. From XCM reference 58 may be an access connection 62 to XCM join module 54.

A data manager host 63 may incorporate a data manager instance 64, an application library 65, a meter manager application instance 66 and a history application instance 67. Application library 65 may incorporate a meter manager application template 68, a history application template 69, and an alarm application template 71. Data manager 64 may incorporate a data manager service module 72 and a network 73. Network 73 may incorporate a meter manager application reference 74 and a history application reference 75. A connection 76 may be between meter manager application reference 74 and meter manager application instance 66. A connection 77 may be between history application reference 75 and history application instance 67. A connection 78 may go from application library 65 to data manager service module 72.

A connection 79 may be between data manager reference 56 in the supervisor and data manager instance 64. Between data manager host 63 and architect 45 may be a connection 81 used for access. A connection 82 for access may be between architect 45 and supervisor 52.

FIG. 3 is a diagram of a data manager with an integrated workflow. A flow may be noted for an architect 85. From a start at symbol 86 may be a connection to a supervisor as indicated in symbol 87. A data manager toolbar button may be selected at symbol 88. A list of virtually all data managers may be displayed at symbol 89 and a data manager may be selected at symbol 91. A connection to a data manager service may be made as indicated in symbol 92.

A question of whether a platform or applications are to be managed may be asked at symbol 93. If an answer is to manage a platform, then the platform may be managed at symbol 94. A flow of activity may stop at symbol 104 after that of symbol 94. If the answer is to manage applications (apps), then a question at a symbol 96 whether there is to be a running of apps or getting of templates may be asked. If an answer is to get templates, then a list of app templates may be obtained at symbol 97 and a list of apps may be displayed at symbol 98. A user choice may be made at symbol 99. A question of whether to add or delete a template may be asked at symbol 101. If an answer is to import a new template, then such template may be imported at symbol 102. If the answer is to delete the template, then such template may be deleted at symbol 103.

If the answer to the question at symbol 96 is running applications, then a list of running apps may be obtained at symbol 105 from a data manager instance 106 of running applications in a data manager service station 107, via a connection 108. After symbol 105, a capacity of the apps may be obtained at symbol 109 via a connection 111 from data manager instance 106. A list of the apps may be indicated and a user action obtained at symbols 112 and 113, respectively. At symbol 114, a question of whether to add an app may be asked. If the answer is no, then a question of whether to delete the application may be asked. If an answer is yes, then the selected app may be deleted at symbol 116, and after the deletion, this path of activity may stop at symbol 104. The deleted app may be provided to data manager instance 106 via a connection 117.

At symbol 115, if the answer is no to deleting the app, then a return to symbol 112 may be made where the list of apps is displayed. User action may be obtained at symbol 113 and the answer to the question whether to add the app at symbol 114 may be yes. A list of app templates may be obtained at symbol 118 from an application template library 119 of application templates via a connection 121. Data manager service station may incorporate application template library 119.

App templates from symbol 118 may be displayed at step or symbol 122. A user choice of the templates may be obtained at symbol 123. An application name associated with a chosen template may be determined at symbol 124. An application IP port may be obtained at symbol 125. A selected app template may be configured to a new app station instance relative to symbol 126. A connection 127 to data manager instance 106 may be a recipient of the application instance noted at symbol 126. The flow of this activity may stop as indicated at symbol 104.

A network 128 and a data manager service module 129 may be incorporated by a supervisor station 131. A connection 132 may go from network 128 to module 129. A connection 133 may go from data manager service 129 to symbol 89 where a list of virtually all data managers is displayed.

FIG. 4 is a diagram of an Opus data manager of an XCM join module. An activity of a supervisor station 135 may start at symbol 136. A new site XCM may be imported at symbol 137. A question, at symbol 138, may ask whether there is to be an XCM join. If an answer is no, then the flow may terminate at symbol 139. If the answer is yes, then the XCM join may be invoked as indicated at symbol 141. An XCM join to a data manager flow is indicated in symbol 142. The flow may begin at a start symbol 143 with an obtaining data manager instances at symbol 144 from a data manager service 145 of a supervisor station 146, via a connection 147 to symbol 144. A network of 163 of station 146 may have a connection 164 to data manager service 145.

At symbol 148, a question of whether any data manager app exists may be asked. If an answer is no, then an XCM may be configured into a main supervisor at symbol 149. The flow may end at symbol 139. If the answer is yes, then virtually all data manager app instances may be obtained at symbol 151 from data manager service 152 of data manager 153 via a connection 154. A question of whether a required app exists may be asked at symbol 155. If an answer is no, then an XCM may be configured into a main supervisor at symbol 149. The flow may end at symbol 139. If the answer is yes, then an app with the most available capacity may be selected at symbol 156. A question of whether a capacity threshold is exceeded may be asked at symbol 157. If an answer is yes, then a user may be alerted with a status update at symbol 158 and a new XCM may be added at symbol 159 to a configuration of the selected data manager app. The flow may end at symbol 139. If the answer is no, then a new XCM may be added at symbol 159 to a configuration of the selected data manager app. The flow may end at symbol 139. Information about the new XCM added to the selected app configuration may be provided to a network 162 of data manager 153 via connection 161. Network 162 may have a connection 165 to data manager service 152.

To recap, a multi supervisor structure may incorporate an architect workbench, a supervisor connected to the architect workbench, and a data manager host connected to the supervisor and the architect workbench. The supervisor may incorporate a data manager service module, a network connected to the data manager service module, and a site controller join module connected to the network.

The data manager host may incorporate a data manager module connected to the network of the supervisor, and an application library connected to the data manager module.

The network of the supervisor may incorporate a data manager module connected to the data manager module of the data manager host and to the site controller join module, a second data manager module, and a site controller connected to the site controller join module.

The data manager module of the data manager host may incorporate a data manager service module connected to the application library, and a network.

The network of the data manager module of the data manager host may incorporate a meter manager application module, and a history application module.

The application library of the data manager host, may incorporate a meter manager template module, a history application template module, and an alarm application template module.

The architect workbench may incorporate one or more items selected from a group having an explorer module, a data manager explorer, a data manager list view, an application list view, and application configuration views.

A data manager system may incorporate a first application server, a second application server connected to the first application server, a third server connected to the first and second application servers, and a customer sites module connected to the first and second application servers. The first application server may incorporate a data manager and a data manager application templates module. The second application server may incorporate a supervisor connected to the data manager of the first application server.

The third server may be a structured query language (SQL) server.

The data manager of the first application server may incorporate a meter manager instance module connected to the data manager application templates module, and history app instance module connected to the data manager application templates module.

The supervisor of the second application server may incorporate an access supervisor connected to the meter manager instance module and the history application instance module of the data manager of the first application server. The customer sites module may incorporate a site controller connected to the history application instance module of the data manager of the first application server and the access supervisor of the second application server. The SQL server may incorporate a database connected to the access supervisor of the supervisor of the second application server and the history application instance module of the data manager of the first application server.

The meter manager instance module of the data manager of the first application server, may collect meter data from multiple sites and sends the data to a utility. The history app instance module of the data manager of the first application server, may collect historical time series and event data provided to the database of the SQL server.

Alarm and event data may be provided by an alarm app to the database of the SQL server.

Each manager instance of the meter manager instance module may support a limited number of deployed meters. Each application instance of the history application instance module may support a limited number of deployed site controllers. If a number of site controllers deployed increases beyond the limited number limit that an application instance can support, then one or more application instances may be added to support a number of site controllers beyond the limited number of site controllers that the application instance can support.

A multi supervisor structure may incorporate a supervisor, one or more data manager hosts connected to the supervisor, and one or more architect clients connected to the supervisor and to the one or more data manager hosts, respectively. Each of the one or more data manager hosts may incorporate a data manager, and an application library connected to the data manager. One or more applications from the application library may be used to distribute work from the supervisor.

An architect client of the one or more architect clients may be available for a local host configuration of a data manager of the one or more data manager hosts.

When the architect client is connected, a data manager and virtually all running applications may be accessible by the architect client.

When the architect client is connected to the supervisor, the architect client may navigate to any instance of the data manager.

The supervisor may provide a new data manager service that supports a seamless integration of data managers and associated applications, respectively.

When a user invokes a site controller join feature, the supervisor may ensure that a new site controller is configured in a distributed application.

If the capacity of any of the one or more applications exceeds a capacity threshold, then a user may be alerted with a status update about the any of the one or more applications.

A data manager station may be joined to the supervisor which allows for a seamless integration of any of virtually all applications added to the data manager.

Any publication or patent document noted herein is hereby incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A multi supervisor structure comprising:
   a server, the server including a supervisor application and the server is in communication with a site controller;
   one or more data manager host servers connected to the server, the one or more data manager host servers are in communication with the site controller; and
   one or more architect clients connected to the server and to the one or more data manager host servers, respectively; and
   wherein:
   each of the one or more data manager host servers comprises:
      a data manager; and
      an application library connected to the data manager, the application library includes one or more applications; and
   wherein when an application from the application library is added to the data manager of a data manager host server, the data manager host server uses the application to perform work with respect to the site controller for the server and provide results of the work to the server.

2. The structure of claim 1, wherein an architect client of the one or more architect clients is available for a local host configuration of a data manager of the one or more data manager host servers.

3. The structure of claim 2, wherein when the architect client is connected to the server, the architect client can navigate to any instance of the data manager.

4. The structure of claim 1, wherein the supervisor application can provide a new data manager service that supports a seamless integration of data managers and associated applications, respectively.

5. The structure of claim 1, wherein when a user invokes a site controller join feature, the supervisor application ensures that a new site controller is configured in a distributed application.

6. The method of claim 1, wherein if the capacity of any of the one or more applications exceeds a capacity threshold, then a user is alerted with a status update about the any of the one or more applications.

7. The structure of claim 1, wherein a data manager station is joined to the server which allows for a seamless integration of any of virtually all applications added to the data manager.

* * * * *